(12) United States Patent
Kimura et al.

(10) Patent No.: US 6,515,076 B1
(45) Date of Patent: Feb. 4, 2003

(54) POLYETHYLENE RESINS AND ITS COMPOUNDS FOR CONTAINER USES AND CONTAINERS

(75) Inventors: Tomohiko Kimura, Ichihara (JP); Fumio Kageyama, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/719,641

(22) PCT Filed: Apr. 16, 1999

(86) PCT No.: PCT/JP99/02035
§ 371 (c)(1),
(2), (4) Date: Dec. 15, 2000

(51) Int. Cl.⁷ .................. C08L 23/06; C08L 23/08; B29D 22/02
(52) U.S. Cl. ............... 525/240; 526/352; 428/35.1; 428/36.8
(58) Field of Search .............. 526/352; 525/240; 428/36.8, 35.1

(56) References Cited

U.S. PATENT DOCUMENTS 5,756,193 A * 5/1998 Yamamoto et al. ......... 428/220

FOREIGN PATENT DOCUMENTS

| JP | A6206939 | 7/1994 |
| JP | A6207056 | 7/1994 |
| JP | A6207059 | 7/1994 |
| JP | A1025355 | 1/1998 |

* cited by examiner

Primary Examiner—David W. Wu
Assistant Examiner—R. Harlan
(74) Attorney, Agent, or Firm—Birch, Stewart, Kolasch & Birch, LLP

(57) ABSTRACT

The present invention provides polyethylene resin and its compounds for container uses, which realize molding of thin-walled articles and high-speed molding, achieves/achieve excellent printability and stress cracking resistance and are suitable for container uses involving tubes, bottles, etc., and containers. Specifically, there are provided a polyethylene resin compound for container uses comprising linear polyethylene having a narrow molecular weight distribution and satisfying specific properties and containers produced therefrom.

16 Claims, No Drawings

POLYETHYLENE RESINS AND ITS COMPOUNDS FOR CONTAINER USES AND CONTAINERS

This application is the national phase under 35 U.S.C. §371 of PCT International Application No. PCT/JP99/02035 which has an International filing date of Apr. 16, 1999, which designated the United States of America.

TECHNICAL FIELD

The present invention relates to polyethylene resin and its compounds for container uses, and containers. More specifically, the present invention relates to polyethylene resin or its compounds which realize molding of thin-walled articles and high-speed molding, achieves/achieve excellent printability and stress cracking resistance and are suitable for container uses involving tubes, bottles, etc. and containers.

BACKGROUND ART

Containers such as tubes for cosmetics, shampoo and detergent, food packaging tubes for mayonnaise, etc., and food packaging bottles for soy sauce, etc. usually have small wall thickness and are manufactured in the blow molding method. These containers are constructed of, for example, either a single layer of high-pressure low-density polyethylene, or two layers consisting of a high-pressure low-density polyethylene layer and a high-density polyethylene layer. The aforesaid container is required to have excellent properties such as environmental stress cracking resistance (ESCR), printability, etc.

The recent trend has been such that improvement in the productivity of these tubes was strongly desired. In order to achieve the improvement in the productivity, studies have been made on approaches to high-speed tube forming processes using linear low-density polyethylene (L-LDPE). Although use of the linear low-density polyethylene of the conventional type certainly facilitates tube forming at high speed, this approach is accompanied by such problem that printing is totally hampered due to the bleeding phenomenon caused by the solvent used in printing ink during the process of printing executed on the surface of the tube.

Such being the case, circles interested have been looking forward to an introduction of such polyethylene resin or its compounds that realizes/realize molding of thin-walled articles and high speed molding, achieves/achieve excellent printability and stress cracking resistance and is/are suitable for container uses involving tubes, bottles, etc.

The present invention is intended to resolve the aforesaid problems associated with the conventional technology, and it does provide such polyethylene resin and its compounds that realize molding of thin-walled articles and high speed molding, achieve excellent printability and stress cracking resistance, and are suitable for container uses involving tubes, bottles, etc., and containers.

DISCLOSURE OF THE INVENTION

Polyethylene resin and its compounds of the present invention comprise a polyethylene resin and resin compounds for container uses, that achieve a 50% cracking appearance time ($F_{50}$) (the elapsed time when 50% of specimens fail), which is an index of stress cracking resistance, of 100 or more hrs. and demonstrate the characteristic of being substantially free of any peel area (the area of defect loss part) on the printed surface in a squared cut test performed on film produced therefrom.

The polyethylene resin for container uses of the present invention represents a polyethylene resin and resin compounds comprising linear polyethylene (A) satisfying the following requirements, (i) Molecular weight distribution (Mw/Mn) as determined by GPC is 2–3.5, (ii) Density is 0.890–0.975 g/cm$^3$, and (iii) Content of component soluble in n-decane at room temperature is 2% by weight or less;

which achieves a 50% cracking appearance time ($F_{50}$) of 100 or more hrs. and demonstrates the characteristics of being substantially free of any peel area on the printed surface in a squared cut test performed on film produced therefrom.

The polyethylene resin and its compounds for container uses, respectively, of the present invention achieves/achieve a 50% cracking appearance time ($F_{50}$), which is an index of stress cracking resistance, of 100 or mores hrs.

The polyethylene resin and its compounds for container uses, of the present invention are required to have such excellent stress cracking resistance as described above and, at the same time, achieve such excellent printability that the printed surface does not substantially get peeled off in a squared cut test performed on film produced from said polyethylene resin and its compounds.

While a detailed explanation is furnished afterwards about the squared cut test, the phrase "does not substantially get peeled off" means that 90% or more, or preferably 95% or more, of coated sections on a specimen film tested in the squared cut test does not get peeled off.

So long as all of the aforesaid requirements are satisfied, the polyethylene resin and its compounds of the present invention can be suitably utilized as resins for container uses.

The linear polyethylene (A) of the present invention comprises a linear polyethylene which satisfies the following requirements.

(i) Molecular weight distribution (Mw/Mn) as determined by GPC is 2–3.5, (ii) Density is 0.890–0.975 g/cm$^3$, and (iii) Content of component soluble in n-decane at room temperature is 2% by weight or less.

The molecular weight distribution is within the range of 2–3.5, or preferably 2–3. When linear polyethylene (A) whose molecular weight distribution is in the aforesaid range is used, there can be provided containers having excellent environmental stress cracking resistance (ESCR) and printability. The molecular weight distribution as referred to in the present invention means molecular weight distribution (Mw/Mn) wherein "Mw" is weight average molecular weight and "Mn" is number average molecular weight as determined by GPC in accordance with a testing procedure described hereinafter.

The linear polyethylene (A) of the present invention comprises ethylene-α-olefin copolymer obtained by copolymerizing ethylene with α-olefin having 3–20 carbon atoms.

As specific examples of said α-olefin, there can be cited α-olefins having 3–20 carbon atoms such as propylene, 1-butene, 1-pentene, 1-hexene, 4-methyl-1-pentene, and 1-octene. Preferred ones among the aforesaid α-olefins are α-olefins having 3–8 carbon atoms such as 1-hexene, 4-methyle-1-pentene, and 1-octene.

The linear polyethylene (A) as used in the present invention contains the structural unit derived from ethylene of usually 95–99 mol. %, preferably 96-98 mol. %, and the structural unit derived from α-olefin having 3–20 carbon atoms at a mol. ratio of usually 1–5 mol. %, preferably 2–4 mol. %.

This linear polyethylene (A) has a density of 0.890–0.975 g/cm³, preferably 0.900–0.960 g/cm³, more preferably 0.900–0.950 g/cm³, furthermore preferably 0.910–0.930 g/cm³. When linear polyethylene (A) of a density falling in said ranges is used, there can be provided containers having excellent environmental stress cracking resistance (ESCR) and printability.

The liner polyethylene (A) as used in the present invention contains 2% by weight or less of component soluble in n-decane at room temperature, or preferably 1% by weight or less. When linear polyethylene (A) containing 2% by weight or less of solubles in n-decane at room temperature is used, there can be provided containers having excellent printability. The less component soluble in n-decane at room temperature are, the narrower becomes the composition distribution.

It is preferable that the linear polyethylene (A) of the present invention satisfies the following relationship between the melt tension (MT) (g) at a temperature of 190° C. and the melt flow rate (MFR)(g/10 min.).

$$MT > 2.2 \times MFR^{-0.84} \quad (i)$$

It is preferable that the linear polyethylene (A) of the present invention satisfies the following relationship between the quantity of component soluble in decane at room temperature (W)(% by weight) and the density (d)(g/cm³).

When MFR≦10 g/10 min., $W < 80 \times \exp(-100(d-0.88)) + 0.1$ (ii-a)

When MFR>10 g/10 min., $W < 80 \times (MFR-9)^{0.26} \times \exp(-100(d-0.88)) + 0.1$ (ii-b)

It is preferable that the linear polyethylene (A) of the present invention satisfies the following relationship between the highest peak (Tm)(° C.) in the endothermic curve as determined using differential scanning calorimeter (DSC) and the density (d).

$$Tm < 400d - 248 \quad (iii)$$

It is most preferable that the linear polyethylene (A) of the present invention satisfies the aforesaid relationships (i), (ii-a) or (ii-b), and (iii) altogether.

It is furthermore preferable that the linear polyethylene (A) of the present invention satisfies the following relationship between the fluidity index (FI)(1/sec) which is defined by the shear rate when the shear stress of the molten polymer at a temperature of 190° C. reaches 2.4×10⁶ dyne/cm² and the melt flow rate (MFR)(g/10 min.).

$$FI > 75 \times MFR \quad (iv)$$

By the way, the melt flow rate of the linear polyethylene (A) is in the range of 0.1–300 g/10 min., or preferably 0.1–100 g/10 min., or more preferably 0.2–10 g/10 min.

Among all types of linear polyethylene (A) achieving the aforesaid properties, a particularly preferred one for the purpose of the present invention is ethylene-α-olefin copolymer obtained by copolymerizing ethylene with α-olefin having 3–12 carbon atoms in the presence of an olefin polymerization catalyst containing a metallocene catalyst component (a).

The linear polyethylene (A) of the metallocene catalyst type as described above can be manufactured by copolymerizing ethylene with α-olefin having 3–20 carbon atoms in the presence of an olefin polymerization catalyst, which is referred to as "metallocene-type olefin polymerization catalyst" containing a metallocene catalyst component such as the ones disclosed in Japan Laid-open Patent Application 1994-9724, Japan Laid-open Patent Application 1994-136195, Japan Laid-open Patent Application 1994-136196, and Japan Laid-open Patent Application 1994-207057.

This kind of metallocene-type catalyst generally comprises a metallocene catalyst component comprising a compound of transition metal belonging to Group IVB of Periodic Table having at least one ligand of the cyclopentadienyl skeleton (a1), an organo-aluminum oxy compound catalyst component (b), a fine particulate carrier (c) and, as required, an organo-aluminum compound catalyst component (d) and/or an ionization ionic compound catalyst component (e).

As a metallocene catalyst component preferably used in the present invention (a1), there is a compound of transition metal belonging to Group IVB of Periodic Table having at least one ligand of the cyclopentadienyl skeleton. There can be cited as an example of this kind of transition metal compound such transition metal compound as is represented by the following formula [I].

$$ML^1_x \quad [I]$$

wherein x is the valency of transition metal atom M.

M is the transition metal atom selected from among those belonging to Group IVB of Periodic Table. Specifically, they are zirconium, titanium, and hafnium. The preferred one among these is zirconium.

$L^1$ is the ligand coordinated in transition metal atom M. At least one ligand $L^1$ is of the type having the cyclopentadienyl skeleton.

As the ligand $L^1$ having the cyclopentadienyl skeleton which is coordinated in the transition metal atom M as described above, there can be specifically cited alkyl-substituted cyclopentadienyl group such as cyclopentadienyl; indenyl group; 4,5,6,7-tetrahydroindenyl group; and fluorenyl group. These groups may be substituted with halogen atom, trialkylsilyl group, etc.

In cases where the compound represented by the above-cited formula [I] contains two or more groups of the cyclopentadienyl structure, two cyclopentadienyl structure groups among them may be bonded to each other via an alkylene group such as ethylene and propylene; silylene group or substituted silylene group such as dimethylsilylene group, diphenylsilylene group, methylphenyl silylene group, etc.

There may be preferably used alumoxane as the organo-aluminum oxy compound catalyst component (b). Specifically, there are employed methylalumoxane, ethyl alumoxane, methylethyl alumoxane, etc. having usually 3–50 repeat units represented by the following formula.

—Al(R)O— wherein R is an alkyl group.

The fine particulate carrier (c) employed for preparing the olefin polymerization catalyst (c) is either an inorganic or organic compound, either in the granular solid or in a fine particulate solid whose particle diameter is generally 10–300 μm, or preferably 20–200 μm.

A porous oxide is preferred as the inorganic carrier. Specifically, $SiO_2$, $Al_2O_3$, MgO, $ZrO_2$, $TiO_2$, etc. can be exemplified.

As specific examples of organo-aluminum compound catalyst component (d) which is employed, as required, in the preparation of the olefin polymerization catalyst, there can be cited trialkyl aluminum such as trimethyl aluminum; dialkyl aluminum halide such as dimethyl aluminum chloride; alkyl aluminum sesquehalide such as methylaluminum sesquechloride.

As examples of the ionization ionic compound catalyst component (e), there can be cited Lewis acid such as triphenyl boron described in U.S. Pat. No. 5,321,106, $MgCl_2$, $Al_2O_3$, and $SiO_2$—$Al_2O_3$; ionic compound such as triphenylcarbenium tetrakis(pentafluorophenyl) borate; carborane compounds such as dodecaborane, bis-n-butyl ammonium (1-carbedodeca) borate.

The linear polyethylene (A) used in the present invention can be obtained by copolymerizing ethylene with α-olefin having 3–20 carbon atoms in the gas phase, or in the liquid phase such as the slurry state or the solution satate under various conditions in the presence of the aforesaid olefin polymerization catalyst.

For preferred linear polyethylene (A) used as the polyethylene resin or its compounds for container uses in the present invention, there can be cited linear polyethylene (A1) within the preferred ranges of a molecular weight distribution (Mw/Mn) as determined by GPC of 2–3.5, preferably 2–3, a density of 0.900–0.950 g/cm3, preferably 0.905–0.930 g/cm$^3$, a content of component soluble in n-decane at room temperature of 2% by weight or less, preferably 1% by weight or less, and a melt flow rate of 0.1–10 g/10 min., preferably 0.2 –10 g/10 min.

It is by using the linear polyethylene (A1) that the polyethylene resin for container uses of the present invention can be obtained.

Furthermore, the polyethylene resin compound for container uses of the present invention is obtained by mixing the linear polyethylene (A1) with another resin. As an example of resins suitably useable as said another resin, high-pressure low-density polyethylene (B) may be cited.

Explanations are furnished as follows about a compound comprising linear polyethylene (A1) and high-pressure low-density polyethylene (B) which is cited as an example of the polyethylene resin for container uses of the present invention.

High-pressure low-density polyethylene (B), which may be used in the polyethylene resin compound for container uses of the present inventio, is a polyethylene manufactured from ethylene under high-pressure in the presence of a radical polymerization catalyst. As required, a small amount of another vinyl monomer may be copolymerized.

The high-pressure low-density polyethylene (B) used in the present invention is in the range of 0.910–0.930 g/cm$^3$, preferably 0.915–0.930 g/cm$^3$.

This high-pressure low-density polyethylene (B) has a melt flow rate of 0.2–10 g/10 min., preferably 0.2–5 g/10 min., more preferably 0.3–3 g/10 min. Use of high-pressure low-density polyethylene (B) having a melt flow rate whithin the aforesaid range facilitates high-speed molding of containers.

Linear polyethylene (A1) is used by more than 50% to less than 100% by weight, or preferably more than 60% to less than 100% by weight, more preferably more than 70% to less than 100% by weight based on 100% by weight representing the total weight of the linear polyethylene (A1) and the high-pressure low-density polyethylene (B). Use of the linear polyethylene (A1) having the aforesaid properties by said ratio can give a polyethylene resin or its compound, which can provide containers having excellent environmental stress cracking resistance and printability.

High-pressure low-density polyethylene (3) is used by not more than 50% to more than 0% by weight, preferably not more than 40% to more than 0% by weight, more preferably 10–30% by weight based on 100% by weight representing the total weight of linear polyethylene (Al) and high-pressure low-density polyethylene (B). When high-pressure low-density polyethylene (B) having the aforesaid properties is used by said ratio, the obtained polyethylene resin compound realizes stable high-speed molding of containers by virtue of its high melt tension which restrains pulsation of the parison.

As another preferred mode of the linear polyethylene (A) used for other polyethylene resin compounds for container uses of the present invention, there can be cited linear polyethylene (A2). Linear polyethylene (A2) has a molecular weight distribution (Mw/Mn) as determined by GPC of 2–3.5, preferably 2–3, a density of 0.890–0.920 g/cm$^3$, preferably 0.900–0.920 g/cm$^3$, a content of component soluble in n-decane at room temperature of 2% by weight or less, preferably 1% by weight or less, and a melt flow rate of 0.1–5 g/10 min., preferably 0.1–2 g/10 min.

Linear polyethylene (A2) can be suitably used particularly in the form of a compound prepared together with another resin.

As an example of another mode of use of the linear polyethylene (A) which can be suitably used in the form of a compound prepared together with another resin, there can be furthermore cited linear polyethylene (A3).

Linear polyethylene (A3) has a molecular weight distribution (Mw/Mn) as determined by GPC of 2–3.5, preferably 2–3, a density of 0.920–0.975 g/cm$^3$, preferably 0.930–0.960 g/cm$^3$, a quantity of component soluble in n-decane at room temperature of 2% by weight or less, preferably 1% by weight or less, and a melt flow rate of 5–300 g/10 min, preferably 10–100 g/10 min.

The aforesaid linear polyethylene (A2) can be mixed with the aforesaid linear polyethylene (A3) to obtain a polyethylene resin compound of the present invention. Moreover, a mixture of the linear polyethylene (A2) and/or the linear polyethylene (A3) with the aforesaid high-pressure low-density polyethylene (B) can be a polyethylene resin compound for container uses of the present invention.

That is to say, a compound comprising at least 2 kinds of resin selected from among the linear polyethylene (A2), the linear polyethylene (A3) and the high-pressure low-density polyethylene (B) can be used as a polyethylene resin compound for container uses of the present invention. The linear polyethylene (A2) is used by 0–70% by weight, or preferably 10–60% by weight, or more preferably 30–50% by weight based on 100% by weight representing the total weight of the linear polyethylene (A2), the linear polyethylene (A3) and the high-pressure low-density polyethylene (B). And, the linear polyethylene (A3) is used by 0–70% by weight, preferably 10–60% by weight, more preferably 20–40% by weight based on 100% by weight representing the total weight. When the linear polyethylene (A3) having the aforesaid properties is used by said ratio, there is obtained such polyethylene resin compound that can provide containers having excellent environmental stress cracking resistance (ESCR) and printability.

The high-pressure low-density polyethylene (B) is used by 50–0% by weight, preferably 40–0% by weight, more preferably 10–30% by weight based on 100% by weight representing the total weight of the linear polyethylene (A2), the linear polyethylene (A3), and the high-pressure low-density polyethylene (B). When the high-pressure low-density polyethylene (B) having the aforesaid properties is used by said ratio, the polyethylene resin compound thus obtained realizes stable molding of containers at high speed by virtue of its high melt tension (MT) which restrains pulsation of the parison.

Amounts to be used of the linear polyethylene (A2), the linear polyethylene (A3) and the high-pressure low-density polyethylene (B), respectively, are selected in such manner that the total becomes 100% by weight, from the above-cited ranges.

As actual modes of polyethylene resin compound containing the aforesaid linear polyethylene (A2), linear polyethylene (A3) or high-pressure low density polyethylene (B), there can be cited the following compounds.

(1) A compound comprising the linear polyethylene (A2) and the linear polyethylene (A3);

(2) A compound comprising the linear polyethylene (A2) and the high-pressure low-density polyethylene (B); and (3) A compound comprising the linear polyethylene (A2), the linear polyethylene (A3) and high-pressure low-density polyethylene (B).

There may be compounded into the polyethylene resin or its compounds for container uses, of the present invention, as requested, known heat stabilizer, UV stabilizer, pigment, antioxidant, antistatic agent, slip agent, filler, etc. to an extent not detrimental to the purpose of the present invention.

The polyethylene resin compound for container uses of the present invention can be obtained by means of mixing the aforesaid components either in a known method using, for example, Henschel mixer, V-blender, ribbon blender, tumbler blender, etc., or by means of furthermore melt-kneading the thus obtained mixture using a single-screw extruder, a double-screw extruder, a kneader, a Banbury mixer or the like, and thereupon by pelletizing the kneaded material or pulverizing the thus obtained lumpy resin.

From the polyethylene resin compound or polyethylene resin obtained by the aforesaid method can be manufactured tubes for cosmetics, shampoo, and detergent, food packaging tubes for mayonnaise, etc., and food packaging bottles for soy sauce, etc. by the known extrusion blow molding method.

Since the polyethylene resin and its compounds for container uses, respectively, of the present invention contain extremely low content of the component soluble in n-decane at room temperature and consequently the soluble component does not bleed into the interior of the container when they are used as a resin for the internal layer of the container, they are suitable for the manufacture of food containers.

The polyethylene and its compounds resin for container uses of the present invention are suitable as a resin for the internal layer of the container constructed of two or more layers for which the aforesaid properties are exploited.

The properties cited in the present invention were determined in accordance with the following test methods.

Test methods (1) 50% Cracking Appearance Time ($F_{50}$) (Environmental Stress Cracking Resistance (ESCR))

2-mm thick compression-molded test sheets were prepared in accordance with ASTM D-1698. Stress cracking resistance tests were carried out with those test sheets for determining a 50% cracking appearance time ($F_{50}$). For the purpose of the present invention, this 50% ($F_{50}$) was adopted as the index of stress cracking resistance.

(2) Squared Cut Test (Adhesion of Printing Ink to the Film (Tube)

The film subjected to this squared cut test (0.4 mm thick) was formed in accordance with the following procedure.

A tube was formed with a tube-molding machine under molding conditions of a resin temperature of 200° C. and a tube take-up speed of 15 m/min.

After subjecting the surface of the thus obtained tube to a corona discharge treatment under such condition that a wetting index of 38 dyne/cm or more was achieved, screen-printing was carried out on the surface of the tube using ultraviolet-curable type ink. The speed of screen-printing was 10 m/min.

Thereupon, a squared cut test was performed on this printed film in accordance with the following procedure. The squared cut test was performed in accordance with JIS K-5400. That is to say, after immersing the printed specimen in warm water maintained at a temperature of 40° C. for 10 minutes, 11 lines×11 lines with 1 mm intervals were cut into the surface of the printed specimen to a depth equivalent to the thickness of the coat. Next, a 100 mm-wide cellophane adhesive tape was sticked onto the cut surface, and the entire surface was rubbed with a rubbing stick in 10 reciprocating strokes in both the lengthwise and widthwise directions. Finally, the cellophane adhesive tape was instantaneously peeled off from the front end.

The adhesion property of the coat was shown in terms of the number of remaining sections of the coat (on average of 3 specimens tested).

(3) Molecular Weight Distribution (Mw/Mn)

Molecular weight distribution (Mw/Mn) was determined in accordance with the following procedure using GPC-150C manufactured by Millipore Co.

The packed (separation) column was TSK GNH HT, and the column dimensions were 72 mm in diameter×600 mm in length. The column temperature was set at 140° C. Using o-dicychlorobenzene (manufactured by Wako Junyaku Kogyo K. K.) for the mobile phase and 0.025% by weight of BHT (manufactured by Takeda Chemical Industries, Ltd.) as antioxidant, the specimen was moved at a speed of 1.0 ml/min. The concentration of the specimen was 0.1% by weight and the volume of injected sample was 500 µL. As the detector, differential refractometer was used. As polystyrene standards, products of Tosoh, Ltd. were used for the molecular weight ranges of less than 1000, and more than $4 \times 10^6$ and products of Pressure Chemical Co., Ltd. for the molecular weight ranges of more than 1000, but less than $4 \times 10^6$.

(4) Composition of Polyethylene

The composition of linear polyethylene was determined by analyzing $^{13}$C-NMR spectra of specimens obtained by dissolving about 200 mg of linear polyethylene in 1 ml of hexachlorobutadiene in a test tube of 10 mm diameter under the testing conditions of a 120° C. temperature, a test frequency of 25.05 MHz, a spectrum width of 1500 Hz, a pulse repeat time of 4.2 sec., and a pulse width of 6 µsec.

(5) Density

The density was determined in accordance with the procedures prescribed in ASTM D-1505. The density was determined with a density gradient tube after heat-treating a strand, which was obtained at the time of measuring the melt flow rate (MFR) under a load of 2.16 kg at 190° C., at 120° C. for 1 hr and gradually cooling it to the room temperature in 1 hr.

(6) Quantity of Component Soluble in n-decane

The quantity of component soluble in n-decane contained in linear polyethylene was determined in the following procedure. 3 g of polyethylene was added to 450 ml of n-decane to be dissolved at 145° C. After cooling the solution to 23° C., insolubles in n-decane were removed by filtration and solubles in n-decane were recovered from the filtrate.

(7) Melt Flow Rate

The melt flow rate was determined in accordance with ASTM D-1238 at a temperature of 190° C. under a load of 2.16 kg.

(8) Melt Tension (MT)

The melt tension was determined by measuring the stress applied when the molten polyethylene was stretched at a constant rate. That is to say, the melt tension was determined using an MT tester manufactured by Toyoseiki Seisakusho, Ltd. using polyethylene pellets as the test specimen under testing conditions of a resin temperature of 190° C., an extrusion speed of 15 mm/min., a wind-up speed of 10–20 m/min., a nozzle diameter of 2.09 mm and a nozzle length of 8 mm.

EXAMPLE

The present invention is further described with reference to examples, but the invention is in no way limited to those examples.

The polyethylene resins used in Examples and Comparative Examples are as follows.

Linear Polyethylene (1) Ethylene-hexene-1 Copolymer (L-PE(1))
Catalyst used for preparation: Metallocene-type catalyst
Mw/Mn: 2.5
Density: 0.920 g/cm$^3$
Melt flow rate: 1.0 g/10 min.
Content of component soluble in n-decane at room temperature: 0.2% by weight
Melt tension (MT): 3 g (2) Ethylene-hexene-1 Copolymer (L-PE(2))
Catalyst used for preparation: Metallocene-type catalyst
Mw/Mn: 2.5
Density: 0.910 g/cm$^3$
Melt flow rate: 0.5 g/10 min.
Content of component soluble in n-decane at room temperature: 0.1% by weight
Melt tension (MT): 6 g (3) Ethylene-hexene-1 Copolymer (L-PE(3))
Catalyst used for preparation: Metallocene-type catalyst
Mw/MN: 2.8
Density: 0.950 g/cm$^3$
Melt flow rate: 100 g/10 min.
Content of component soluble in n-decane at room temperature: 1.0% by weight
Melt tension (MT): 0.5 g Physical properties of the aforesaid L-PE(1), L-PE(2), and L-PE (3), respectively, are shown in Table 1.

(4) Ethylene-hexene-1 Copolymer (L-PE(4))
Catalyst used for preparation: Ziegler-type catalyst
Mw/Mn: 5
Density: 0.925 g/cm$^3$
Melt flow rate: 1.0 g/10 min.
Content of component soluble in n-decane at room temperature: 6.2% by weight
Melt tension (MT): 2 g High-pressure Low-density Polyethylene (HPLDPE)

Density: 0.920 g/cm$^3$
Melt flow rate: 0.5 g/10 min.
Content of component soluble in n-decane at room temperature: 0.3% by weight
Melt tension (MT): 15 g Examples 1–4 and Comparative Examples 1–3

The polyethylene resins and polyethylene resin compounds shown in Table 1 were tested as for their stress cracking resistance and adhesion of printing ink to the sheet in accordance with the aforesaid test methods.

By the way, said polyethylene resin compounds were prepared by means of mixing and extruding those polyethylene components using a single-screw extruder (65 mm diameter) at a temperature of 200° C.

Test results are shown in Table 2 set forth as follows.

TABLE 1

| Copolymers | | L-PE (1) | L-PE (2) | L-PE (3) |
|---|---|---|---|---|
| Comonomer | Kind<br>Content<br>(mol %) | Hexene-1<br>2.8 | Hexene-1<br>3.9 | Hexene-1<br>1.0 |
| MFR(g/10 min.) | | 1.0 | 0.5 | 100 |
| Mw/Mn | | 2.5 | 2.5 | 2.8 |
| Density (g/cm$^3$) | | 0.920 | 0.910 | 0.950 |
| Solubles in n-decane (wt %) | | 0.2 | 0.1 | 0.1 |
| *1 | | 1.57 | 4.08 | — |
| **1 | | — | — | 0.3 |
| Tm (° C.) | | 115 | 112 | 127 |
| MT (g) | | 3 | 6 | 0.5 |
| *2 | | 2.2 | 3.9 | 0.05 |
| *3 | | 120 | 116 | 132 |
| FI (s$^{-1}$) | | 420 | 280 | 12000 |
| *4 | | 75 | 38 | 7500 |

*1: The value is equivalent to W < 80 × exp( −100(d − 0.88)) + 0.1
**1: The value is equivalent to W < 80 × (MFR − 9)$^{0.26}$ × exp(−100(d − 0.88)) + 0.1
*2: The value is equivalent to 2.2 × MFR$^{-0.84}$
*3: The value is equivalent to 400 × d − 248
*4: The value is equivalent to 75 × MFR

TABLE 2

| | | Polyethylene resin | | | | Polyethylene resin compound | | | | Properties as a sheet | |
|---|---|---|---|---|---|---|---|---|---|---|---|
| | Components | ratio (wt %) | MFR (g/10 min) | Density (g/cm$^3$) | MT (g) | Solubles in n-decane (wt %) | MFR (g/10 min) | Density (g/cm$^3$) | MT (g) | Solubles in n-decane (wt %) | ESCR (hr) (*1) | Squared cut test (*2) |
| Example 1 | L-PE (1) | 100 | 1.0 | 0.920 | 3 | 0.2 | — | — | — | — | 300 | 100/100 |
| Example 2 | L-PE (2) | 50 | 0.5 | 0.910 | 6 | 0.1 | 2.0 | 0.930 | 4 | 0.1 | >600 | 100/100 |
| | L-PE (3) | 50 | 100 | 0.950 | 0.5 | 0.1 | | | | | | |

TABLE 2-continued

| | | Polyethylene resin | | | | | Polyethylene resin compound | | | Properties as a sheet | |
|---|---|---|---|---|---|---|---|---|---|---|---|
| | Components | ratio (wt %) | MFR (g/10 min) | Density (g/cm³) | MT (g) | Solubles in n-decane (wt %) | MFR (g/10 min) | Density (g/cm³) | MT (g) | Solubles in n-decane (wt %) | ESCR (hr) (*1) | Squared cut test (*2) |
| Example 3 | L-PE (1) | 80 | 1.0 | 0.920 | 3 | 0.2 | 0.8 | 0.920 | 7 | 0.9 | 150 | 100/100 |
| | HPLDPE | 20 | 0.5 | 0.920 | 15 | 0.3 | | | | | | |
| Example 4 | L-PE (2) | 40 | 0.5 | 0.910 | 6 | 0.1 | 1.5 | 0.926 | 8 | 0.1 | 500 | 100/100 |
| | L-PE (3) | 40 | 100 | 0.950 | 0.5 | 0.1 | | | | | | |
| | HPLDPE | 20 | 0.5 | 0.920 | 15 | 0.3 | | | | | | |
| Comp. Example 1 | HPLDPE | 100 | 0.5 | 0.920 | 15 | 0.3 | — | — | — | — | 5 | 0/100 |
| Comp. Example 2 | L-PE (4) | 100 | 1.0 | 0.925 | 2 | 6.2 | — | — | — | — | 150 | 15/100 |
| Comp. Example 3 | L-PE (4) | 80 | 1.0 | 0.925 | 2 | 6.2 | 0.8 | 0.922 | 5 | 5.2 | 20 | 12/100 |
| | HPLDPE | 20 | 0.5 | 0.920 | 15 | 0.3 | | | | | | |

(*1) 50% cracking appearance time ($F_{50}$) (environmental stress cracking resistance)
(*2) The number of sections which remained peel-free after the peeling test/100 (test section number)

Industrial Applicability

The present invention provides polyethylene resin and its compounds for container uses, respectively, which realizes/realize molding of thin-walled articles and high-speed molding, achieves/achieve excellent printability and stress cracking resistance and is/are suitable for container uses involving tubes, bottles, etc. and containers.

What is claimed is:

1. A polyethylene resin for container uses which comprises linear polyethylene (A) satisfying the following requirements,
   (i) Molecular weight distribution (Mw/Mn) as determined by GPC is 2–3.5,
   (ii) Density is 0.890–0.975 g/cm³, and
   (iii) Content of component soluble in n-decane at room temperature is 2% by weight or less,
achieves a 50% cracking appearance time (F50) of 100 hrs. or more, and demonstrates that the printed surface as tested in a squared cut test performed in the film form, does not substantially get peeled off.

2. The polyethylene resin for container uses according to claim 1 wherein said linear polyethylene (A) comprises linear polyethylene (A1) satisfying the following requirements;
   (i) Molecular weight distribution (Mw/Mn) as determined by GPC is 2–3.5,
   (ii) Density is 0.900–0.950 g/cm³, and
   (iii) Content of component soluble in n-decane at room temperature is 2% by weight or less, and
   (iv) Melt flow rate is 0.1–10 g/10 min.

3. The polyethylene resin for container uses according to claim 1 or claim 2 wherein said linear polyethylene (A) satisfies:
   (1) the following relationship between the melt tension (MT)(g) at a temperature of 190° C. and the melt flow rate (MFR) (g/10 min)

$MT > 2.2 \times MFR^{-0.84}$ (2) the following relationship between the content soluble in decane (W)(% by weight) at room temperature and the density (d)(g/cm³);

When MFR≦10 g/10 min, $W < 80 \times \exp(-100(d-0.88)) + 0.1$

When MFR>10 g/10 min., $W < 80 \times (MFR-9)^{0.26} \times \exp(-100(d-0.88)) + 0.1$;

(3) the following relationship between a temperature of highest peak (Tm)(° C.) on the endothermic curve as determined using differential scanning calorimeter (DSC) and the density (d)

$Tm < 400 \times d - 248$.

4. The polyethylene resin for container uses according to claim 3 wherein said linear polyethylene (A) furthermore satisfies
   4) the following relationship between the fluidity index (FI(1/sec)) as defined by the shear speed when the shear stress of the molten polymer at a temperature of 190° C. reaches $2.4 \times 10^6$ dyne/cm² and the melt flow rate (MFR)(g/10 min.)

$FI > 75 \times MFR$.

5. A container obtained by molding the polyethylene resin defined in claim 1 or claim 2.

6. The container according to claim 5 wherein the molding is a extrusion blow molding.

7. A polyethylene resin compound for container uses which comprises linear polyethylene (A) satisfying the following requirements:
   (i) Molecular weight distribution (Mw/Mn) as determined by GPC is 2–3.5,
   (ii) Density is 0.890–0.975 g/cm³, and
   (iii) Content of component soluble in n-decane at room temperature is 2% by weight or less,
achieves a 50% cracking appearance time ($F_{50}$) of 100 hrs. or more, and demonstrates that the printed surface as tested in a squared cut test performed in the film form, does not substantially get peeled off.

8. The polyethylene resin compound for container uses according to claim 7 wherein the aforesaid linear polyethylene (A) satisfies the following requirements:
   (1) the following relationship between the melt tension (MT) (g) at a temperature of 190° C. and the melt flow rate (MFR)(g/10 min.)

$MT > 2.2 \times MFR^{-0.84}$ (2) the following relationship between the content of component soluble in decane at room temperature (W)(% by weight) and the density (d)(g/cm³);

When MFR≦10 g/10 min., $W<80\times\exp(-100(d-0.88))+0.1$

When MFR>10 g/10 min., $W<80\times(\text{MFR}-9)^{0.26}\times\exp(-100(d-0.88))+0.1$;

(3) the following relationship between the temperature of highest peak (Tm)(° C.) in the endothermic curve as determined using differential scanning calorimeter (DSC) and the density (d)

$Tm<400d-248.$

9. The polyethylene resin compound for container uses according to claim 8 wherein the linear polyethylene (A) furthermore satisfies (4) the following relationship between the fluidity index (FI)(1/sec) which is defined by the shear rate when the shear stress of the molten polymer at a temperature of 190° C. reaches $2.4\times10^6$ dyne/cm² on one hand and the melt flow rate (MFR)(g/10 min.) on the other $FI>75\times MFR.$

10. The polyethylene resin compound according to claim 7 which comprises more than 50% to less than 100% by weight of linear polyethylene (A1) having a molecular weight distribution (Mw/Mn) as determined by GPC of 2–3.5, a density of 0.900–0.950 g/cm³, a content of component soluble in n-decane at room temperature of 2% by weight or less, and a melt flow rate of 0.1–10 g/10 min., and not more than 50% to more than 0% by weight of high-pressure low density polyethylene (B) having a density of 0.910–0.930 g/cm³ and a melt flow rate of 0.2–10 g/10 min.

11. The polyethylene resin compound for container uses according to claim 7 which comprises at least 2 components selected from the group consisting of 0–70% by weight of linear polyethylene (A2) having a molecular weight distribution (Mw/Mn) as determined by GPC of 2–3.5, a density of 0.890–0.920 g/cm³, a content of component soluble in n-decane at room temperature of 2% by weight or less, and a melt flow rate of 0.1–5 g/10 min.; 0–70% by weight of linear polyethylene (A3) having a molecular weight distribution (Mw/Mn) as determined by GPC of 2–3.5, a density of 0.920–0.975 g/cm³, a content of component soluble in n-decane at room temperature of 2% by weight or less, and a melt flow rate of 5–300 g/10 min.; and 50–0% by weight high-pressure low-density polyethylene (B) having a density of 0.910–0.930 g/cm³ and a melt flow rate of 0.2–10 g/10 min.

12. A container obtained by molding the polyethylene resin compound defined in any one of claims 7–11.

13. The container according to claim 12 wherein the molding is extrusion blow molding.

14. A container obtained by molding the polyethylene resin or the polyethylene resin composition defined in claim 3.

15. The container according to claim 14, wherein the molding is an extrusion blow molding.

16. The container according to claim 14, which has a multi-layer construction of two or more layers whose internal layer is formed from the polyethylene resin or the polyethylene resin composition.

* * * * *